Dec. 6, 1927.
R. A. KRAUSS
1,652,017
RHEOSTAT
Filed June 21, 1922
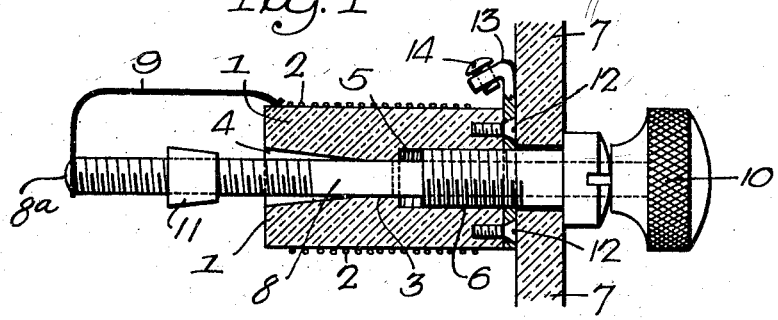
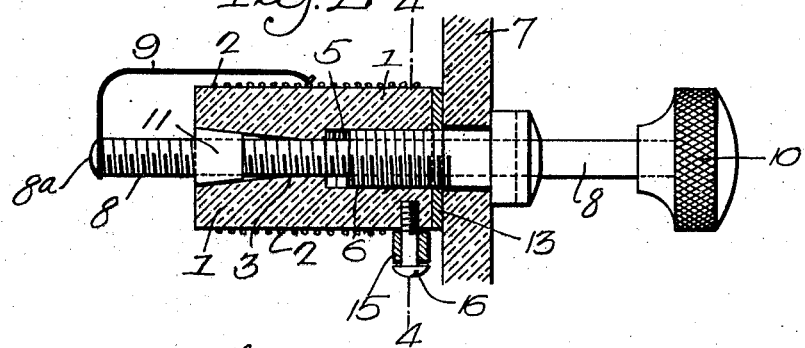
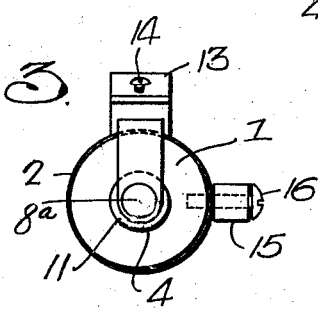 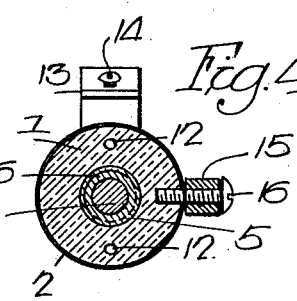
Inventor.—
Ralph A. Krauss.
by his Attorneys.—
Howson & Howson Patented Dec. 6, 1927.

1,652,017

UNITED STATES PATENT OFFICE.

RALPH A. KRAUSS, OF PHILADELPHIA, PENNSYLVANIA.

RHEOSTAT.

Application filed June 21, 1922. Serial No. 569,831.

One object of this invention is to provide a rheostat affording extremely delicate adjustments.

A further object of the invention is to provide a rheostat capable of rough adjustment with comparative rapidity approximately to the desired setting, thereby greatly facilitating the ultimate adjustment.

A still further object is to provide means whereby after proper adjustment is made, the rheostat may, if the setting is disturbed or intentionally broken, be returned accurately and quickly to the original setting.

In the attached drawings:

Figure 1, is a vertical section through a rheostat made in accordance with my invention and a panel-board to which the device is adapted to be secured;

Fig. 2, is a horizontal section through the rheostat and the panel-board showing the elements of the rheostat in a position differing from that in which they are shown in Fig. 1;

Fig. 3, is a rear elevation of the rheostat, and

Fig. 4, is a section on the line 4—4, Fig. 2.

With reference to the drawings, the rheostat comprises a cylindrical body 1, of insulating material, upon which is wound a coil 2 of resistance wire. The body 1 has a longitudinal central bore 3, having extending inwardly from one end a tapered counterbore 4, and from the other end a threaded counterbore 5, which latter is adapted to receive a bolt or screw 6, by means of which the cylinder may be attached to a panel-board 7. The screw 6 is hollow, and slidable within the bore 3 of the cylinder 1 and the said hollow screw 6 is a stem 8 threaded at the rear end thereof, and having at the forward end, in the present instance, a knob 10 by means of which the said stem may be rotated or moved axially within the cylinder and the screw 6. Upon the threaded portion of the stem is a nut 11, circular in form and tapered to fit the tapered recess 4 of the spool, as best shown in Fig. 2, and attached to the inner end of the stem 8, in the present instance by a rivet 8ª, is a metal contact element 9 which extends forward over the spool and contacts with its depressed forward end against the resistance wire 2. The pitch of the coil 2 is identical with the pitch of the screw threads on the stem 8.

The forward face of the spool 1 has attached thereto, by means in the present instance of screws 12, 12, a metal post 13, said post extending upwardly and turning rearwardly at the top over the cylinder, there being in said post a screw 14 by means of which a wire may be attached. The element 13, preferably, is also threaded to receive the screw 6, so that a good electrical contact is formed between the said element and the screw. Secured to the side of the cylinder 1 and also at the forward end thereof is a metal binding post 15, said post in the present instance being secured to the cylinder by means of a screw 16, and being in electrical contact with the forward end of the coil 2 of resistance wire. The screw 16 in addition to holding the post 15 in place constitutes also means for attaching a wire to the post.

The operation of the device is as follows: The device being secured in place upon the panel 7, the wires of an electric circuit are secured to the binding post 15 and to the post 13. When the spring contact member 9 engages the coil 2, the circuit is made from the binding post 13 through the screw 6, the screw stem 8, the contact element 9, the coil 2, and the post 15, the amount of the resistance coil 2 which is in this circuit being determined by the position of the stem 8 and the contact element 9. In adjusting the rheostat to give a certain desired resistance in the circuit, the stem 8 is first moved axially until the approximate setting is obtained or until the nut 11 enters the tapered recess 4, as shown in Fig. 2, after which the stem is rotated until the desired setting is obtained. In rotating the stem after the nut 11 has entered the recess, the stem is fed axially by reason of the threaded engagement with the said nut which is held by friction immovable in the recess. This axial feeding movement due to the threads on the stem and in the nut 11 causes the contacting end of the element 9, by reason of the aforesaid corresponding pitches of the coil and stem threads, to follow the wire as it passes around the cylinder. If, however, the nut is not seated in the recess, the axial movement of the stem when it is rotated is still obtained by reason of the resilient nature of the element 9, which tends to retain the wedge-like contacting end in the interspace between two contiguous turns of the spiral conductor.

The setting having been obtained with tapered nut 11 in position, the circuit can be quickly broken by moving the knob 10 until it touches bolt 6, the tapered nut 11 being thus pushed out of recess 4 and contact element 9 being forced beyond the end of conductor 2. When it is desired to close the circuit, the knob being pulled out until the nut 11 engages in recess 4, the contact element will have returned to its previous position, giving the same setting as before.

It will be apparent that the device provides by reason of the movement of the contact element along the wire an extremely accurate setting, while the free axial sliding movement of the stem in the cylinder affords opportunity for quick adjustment or accurately or approximately as the case may be, to the desired setting.

The device will find a particular application to wireless telephony and telegraphy by reason of the minuteness of the setting and the ability for quick movement to the adjusted position.

I claim:

1. In a rheostat, the combination with a cylindrical body, of a conductor spirally wound around said body, a threaded stem mounted in the body concentrically with the spiral and slidable axially thereof, a recess in one end of the body, a nut on said stem adapted to enter said recess and to be held fixed therein, and a contact element carried by the stem and adapted to engage the said conductor.

2. In a rheostat, the combination with a cylindrical body, of a conductor spirally wound around said body, a threaded stem mounted in the body concentrically with the spiral and freely movable in said body axially of the spiral, the pitch of the said threads and of the spiral being identical, a nut carried by and movable with the stem and adapted to be held fixed relative to the body by engagement therewith, and a contact element carried by the stem and adapted to engage the conductor.

3. In a rheostat, the combination with a cylindrical body having a central longitudinal bore threaded at one end, a hollow bolt adapted to enter said threaded end of the bore to retain the body on a supporting structure, a threaded stem longitudinally slidable in said bore and in the hollow bolt, a nut carried by the stem and adapted to enter the bore and therein to be retained against rotational movement relative to the body, a conductor spirally wound around the body, the spiral having a pitch corresponding to the threads on said stem, and a contact element carried by the stem and adapted to engage the conductor.

4. In a rheostat, the combination with a body portion, of a resistance element carried thereby, an element supported by the body and adapted to contact with the resistance element, means for adjusting the contact element with respect to the resistance element, and body-engaging means movable with and adjustable with respect to the said contact element, said body-engaging means being adapted to limit the adjustment of the contact element with respect to the resistance element.

5. A vernier rheostat having a helical resistance coil, a yielding contact therefor, means for moving one or the other of the said elements transversely and concentrically with respect to the other, whereby the individual convolutions of the coil are cut into and out of the circuit for the coarse regulation thereof, and whereby any fraction of any convolution of the coil is cut into or out of the circuit for the fine regulation thereof, and adjustable means for predetermining the minimum resistance of the coil to the passage of a current through it.

6. A vernier rheostat having a spool, a helical resistance coil thereon, a longitudinally movable and rotary shaft passing through the spool, a yielding contact carried by the shaft and moved transversely thereby over the said coil for the coarse regulation of the current and concentrically for the fine regulation thereof; and adjustable means mounted upon the shaft for predetermining the minimum resistance of the coil to the passage of a current through it.

RALPH A. KRAUSS.